Patented Aug. 24, 1937

2,091,202

UNITED STATES PATENT OFFICE 2,091,202

ALKALI METAL SILICATES

George W. Hallock and Ebenezer Skinner, Bloomfield, and James Cardell, Wood-Ridge, N. J.

No Drawing. Application August 8, 1935, Serial No. 35,398

12 Claims. (Cl. 23—243)

This invention relates to new and useful forms of alkal metal silicates and more particularly the ortho-silicates, as well as the method for preparing these products.

Sodium silicate, which is commonly termed water-glass when in solution, is a composition that has long been known and generally contains a substantial excess of silica over the formula of the sodium meta-silicate which is one molecule of sodium oxide to one molecule of silica. Sodium silicate has been prepared in a solid somewhat crystalline form which is soluble in water. In making or producing the sodium silicate in solidified form a number of problems have arisen in connection with maintaining its solubility and also when its solubility has been maintained in preserving the material in such a manner that it will not cake and form a sticky, gummy mass which is difficult to handle, ship or sell. In recent years considerable work has been done on establishing the composition of waterglass and particular silicates have been formed as, for example, the meta-silicate which crystallizes with variable amounts of water of crystallization, the sesqui-silicate crystallizing with about nine molecules of water and having about one and one-half molecules of sodium oxide to each molecule of silica and others. Orthosilicates which have two molecules of sodium oxide to each molecule of silica are also known, but have thus far not enjoyed any substantial commercial use, although the advantages of such a high alkali product have been recognized.

The alkali metal silicates are commonly used in detergents and have been shipped to the user in liquid form containing a substantial amount of water, which necessarily increases transportation costs. If the water is to some extent removed and the material crystallized, it could be shipped in small containers more readily than can the liquid and also could be mixed with other types of detergents to form powders. If one attempts to use the silicates containing an alkali ratio approximating that of the meta-silicate or higher in solid form, it has been found to be difficult, if not impossible, even among the compounds containing only small excesses of alkali over the meta-silicate to produce granular products which could be stored and shipped without the use of expensive moisture and corrosion-proof containers to preserve them in their original form. It was thus found that there was no advantage from the shipping point of view in reducing the water content when it was then necessary to use expensive specially prepared metallic containers. Such containers also convey to the consuming laundryman the idea of a strongly corrosive material and since he has been warned to avoid ordinary strong caustics he is unwilling to accept for use a high alkali silicate that looks and must be handled like a strong alkali.

The art has recognized the desirability of a silicate containing an excess of alkali over the amount present in the meta-silicate and has suggested methods for preparing such compounds as well as means for maintaining the material in a granular free flowing state. These suggested solutions to the problem have included the addition of various inert materials such as clay, chalk, silica, natural stone, sawdust, peat, turf, magnesia, sand, lime and the like, to the solidified material. The addition of these, what might be termed inert, materials to the alkali metal silicates has not proved successful unless excessive amounts of the inert material were added and even the addition of small amounts of materials of the type above noted made the resulting product unsatisfactory for detergents which were to be dissolved, since the added materials are practically insoluble. The use of such mixtures was therefore limited to scouring powders. Soap has also been suggested as a stabilizer for silicates, but very large amounts were necessary.

There have been suggestions to use starch as a stabilizer for certain salts which are very definite compounds and crystallize with fixed amounts of water of crystallization but under certain conditions tend to absorb moisture and become lumpy or pasty. These salts are all quite different from the alkali metal silicates which generally have no exact composition as commercially prepared and instead of crystallizing as individual crystals solidify as a mass. The problem which arises in connection with alkali metal silicates is accordingly quite different from the case of salts of the above described type.

It has been found that by using a relatively small percentage of starch with alkali metal silicates that granular products may be secured which are free flowing, non-pasty, non-gummy and non-caking, which absorb moisture very slowly and which may be stored and shipped in wooden shipping containers without charring the wooden container. Such products are particularly useful as detergents either alone or as an ingredient in other detergent mixtures.

This invention therefore includes among its more important objects the provision of alkali metal silicates, which would normally tend to become pasty, gummy, or to cake, in the form of granular particles that are free flowing when prepared and which under normal conditions of storage and shipping will maintain such free flowing characteristics.

It is an important object of this invention to provide a silicate with a relatively high alkali metal oxide ratio as, for example, the orthosilicate, which is particularly useful as a detergent in laundries, dairies and the like, because of its higher caustic value, but which, at the same time, is not subject to the disadvantages inherent in free caustic and which product is in a readily usable granular form and free flowing so that it may be handled, stored and shipped without becoming pasty, caking or charring inexpensive wooden shipping containers.

Another object is the provision of a high alkali detergent containing an inhibitor or stabilizer that will not retard the solubility of the detergent or injure or affect any area or fabric that a non-inhibited product would not harm.

To prepare an alkali metal silicate with the characteristics above set forth, a suitable amount of alkali metal silicate, either in the form of a solution such as waterglass, or as solidified sodium silicate, is measured out in a suitable alkali-resistant container. If the original silicate contains insufficient alkali, free caustic is added until the desired ratio between alkali metal oxide and silica is obtained. If a solid form of sodium silicate has been used, it may be liquefied in any known manner or will be liquefied by the alkali metal hydroxide or caustic added and in any event the reaction causes a substantial rise in temperature and a relatively thin liquid is obtained. After a thorough mixing the liquid is permitted to cool until its temperature does not substantially exceed about 100° F. and preferably considerably lower so that the starch when added will not be affected by exposure to high temperatures. To the cooled or moderately heated alkali metal silicate solution is then added the desired quantity of starch, depending on a number of factors such as the ratio of alkali metal oxide to silica and the amount of water, the details of which will be hereinafter more fully set forth, and when this starch has been thoroughly mixed and completely dissolved into the solution, the solution is cooled until it begins to stiffen and give positive indications of hardening. When this occurs the mass is poured into a steel or other suitable pan to harden thoroughly, after which it is removed from the container and broken into small pieces by the use of hammers or a crushing machine. The material will then probably not be hard enough to grind and sieve satisfactorily, but if given a seasoning treatment at normal temperatures for about twenty-four hours it will be in a state so that it can be ground by a Mueller mill using a grinding blade with 3/32 inch holes. The ground material is then ready to be packed and shipped in wooden barrels. This material, produced in the manner above described, will maintain its free flowing characteristics despite adverse temperature and humidity conditions and will not char the wooden container.

An alternative method for treating the silicate after it has solidified, when adverse uncontrollable humidity conditions prevail at the plant involves removing the material from the solidifying pan shortly after it has solidified then crushing and grinding it through a ¼ inch hole grinding plate without any previous ageing. The ground and still hot stabilized silicate after spreading and cooling is packaged for shipment.

Instead of pouring the material into solidifying containers, as above described, after the starch has been added, it may be solidified by other known means, as for example, on the surface of a cooling drum from which it may be chipped, or, on the other hand, the material may be atomized and spray-dried or cooled.

A specific example of a method by means of which an orthosilicate may be prepared is as follows. About 100 pounds of K brand sodium silicate (Philadelphia Quartz Company) containing approximately 11.0% $Na_2O$, 31.2% $SiO_2$ and the remainder water (47° Bé.), is placed in a container and to it about 68 pounds of flake 76% sodium hydroxide added to give the orthosilicate. The mixture is stirred until solution is complete and cooled to below 95° F., when 24 pounds or about 15% of Globe Pearl starch (corn starch) is added and thoroughly mixed until well dissolved. It is preferable to maintain the temperature above 60° F. in order to cause a starch paste to form, but excessive heat should be avoided. Stirring is continued as the mixture cools, particularly after the starch has been added, to prevent caking at the top and sides and to keep the mass uniform. When it has cooled to a point just above solidification, it is poured into a suitable container in which it solidifies. After the material has solidified it is broken, aged and ground, preparatory to packaging.

In the foregoing example 24 pounds of starch were employed. This amount was recommended because of the relatively high water content of K brand silicate and because the final product contained a sodium oxide to silica ratio of 2 to 1. If the amount of water in the original silicate had been less or a lesser amount of excess alkali added, a smaller amount of starch would have been sufficient.

On the other hand if 100 pounds of N brand silicate containing approximately 8.9% $Na_2O$, 28.7% $SiO_2$ and the remainder water (41° Bé.) is reacted with 64 pounds of sodium hydroxide as in the foregoing example, a somewhat greater amount of starch is preferably added, for example about 27 pounds or about 16.5%.

In order to determine the proper amount of starch to be added to orthosilicates, various tests were run with varying percentages of starch from about 3.5% to about 20%, along with test samples of ortho- and meta-silicate, as well as pure caustic. Pure caustic when kept at a temperature of about 100° F. with 83% humidity absorbed 5% of water in five hours and immediately became sticky, gummy and eventually coalesced. During the same period the orthosilicate containing about 5.8% of starch absorbed about 1% of moisture, while the orthosilicate without any starch absorbed 3.5% moisture. At the end of four days of successive exposures under varying degrees of humidity from 68 to 90% and dry bulb temperatures from 61 to 100° F. the orthosilicate without the addition of any starch had absorbed over 15% of moisture and was a wet and gummy paste. A meta-silicate test sample under similar conditions was a hard, lumpy, gummy mass. Of the samples to which starch had been added, that containing 3.5% starch was damp, but those containing 4.7% or more all sieved by hand very readily and were very free flowing. The sample containing 3.5% starch, although damp, had not coalesced and could be sieved and readily handled as a granular material.

Similar tests were conducted on samples exposed in an open shed during four days of very humid weather, three of which had rain. A test meta-silicate sample was very gummy, compact and lumpy, an orthosilicate sample very wet and pasty. The orthosilicate containing 3.5% starch by weight was a little gummy and too wet to sieve, but still free flowing. The samples containing higher percentages of starch all sieved readily and were free flowing. An interesting fact brought out by this test was that although the sample containing 3.5% starch by weight absorbed about a percent more moisture than the unstabilized orthosilicate, it still maintained free flowing characteristics and the meta-silicate which absorbed very little moisture became very gummy, compact and lumpy.

Similar tests were conducted using various inert materials of the type mentioned at the beginning of the specification and in all of these cases it was found that the inert materials acted simply as diluents and did not give any results at all comparable to the starch even when used in quantities two and three times as great as the starch.

An alternative method for preparing the stabilized silicate is similar to the example given above in that caustic alkali in the desired proportions is added to the silicate which may contain a high excess of silica, after which the liquid formed is permitted to cool until solidified, when it may be broken up and ground. At the end of a short seasoning process the solidified silicate is ground and the starch mixed therewith mechanically. This method produces a stabilized product but larger quantities of the starch are necessary and the results are not as good as when the specific process above described is employed.

It has been found that starch is peculiarly adapted as an inhibitor for stabilizing the silicates and maintaining free flowing characteristics. It is a particularly good material for adding to the alkali metal silicates when they are to be used as detergents since they have no deleterious effects in this connection, being inexpensive, non-poisonous and readily soluble in water. They are useful in detergents because they soften water, have some cleaning efficiency, prevent lime soap formations and swell on dissolving, thereby assisting in dispersing in the media. Since the starch need be added only in relatively small amounts, it does not impair the effectiveness of the silicate. Various kinds of starch may be used in place of the corn starch of the example including potato, cassava and the like. When adding other materials such as sulfonated oils to the silicate for making composite detergents, the amount of starch used may conveniently be reduced. In some cases the addition of a preservative or fungicide to prevent molding of the starch may be desirable.

The stabilized silicate produced according to the teachings of this invention is useful not only per se as a detergent, but also as a component of detergent mixtures; a suitable composition comprising:

| | Percent |
|---|---|
| Anhydrous sodium orthosilicate, stabilized with starch | 38.3 |
| Soda ash | 20 |
| Tri-sodium phosphate | 4.4 |
| Sulfonated castor oil | 1.1 |
| Starch | 1.7 |
| Moisture (water of crystallization) | 34.5 |

Without the use of starch a saleable product containing more than 25% of orthosilicate could not be produced.

Another detergent composition included:

| | Percent |
|---|---|
| Anhydrous orthosilicate | 38 |
| Sodium carbonate | 20 |
| Trisodium phosphate | 5 |
| Water (principally water of crystallization) | 34 |
| Starch | 3 |

In producing compositions such as those described above, successful results have been secured by the plain addition of the starch to the detergent rather than previously stabilizing the silicate according to the specfic example given above.

Although the invention has been specifically described as applied to sodium silicates it will be evident that the silicates of other alkali metals may be similarly treated. The invention is particularly important when applied to the orthosilicates or other high alkali silicates but is useful in connection with all types of alkali metal silicates even where low ratios of alkali metal oxides are present.

Having thus described our invention with reference to certain preferred embodiments which are to be considered as illustrative and not in limitation thereof, what we claim is:

1. The process for stabilizing alkali metal silicates to produce an alkali metal silicate that is granular, freeflowing and substantially non-caking which comprises preparing a fluid mass of sodium silicate and water, mixing from substantially 3.5 to 15% of undissolved starch therewith, solidifying and comminuting the mixture.

2. The process for preparing stabilized, alkali metal ortho-silicates from alkali metal silicates to produce an alkali metal silicate that is granular, freeflowing and substantially non-caking which comprises adjusting the ratio of alkali metal oxide to silica until it is two to one, adding up to substantially 15% of starch to the fluid mixture when it is at a moderately elevated temperature, then solidifying and comminuting the stabilized alkali metal ortho-silicate.

3. The process for preparing granular alkali metal ortho-silicates that are freeflowing and substantially non-caking which comprises mixing suitable proportions of alkali metal silicate and caustic alkali to produce a fluid mixture with a ratio of sodium oxide to silica of two to one, adjusting the temperature of the mass until it is not substantially above 100° F. and incorporating approximately ten per cent of starch, cooling the mass until it solidifies and grinding the solidified stabilized alkali metal ortho-silicates.

4. The process for stabilizing alkali metal ortho-silicates to produce an alkali metal silicate that is granular, freeflowing and substantially non-caking which comprises mixing suitable proportions of alkali metal silicate and caustic alkali to produce a fluid mixture, adjusting the temperature of the mass until it is not substantially above 100° F. and incorporating from substantially 3.5 to 15% of starch therewith, cooling the mass until it solidifies and comminuting the solidified, stabilized, alkali metal ortho-silicates.

5. The process for stabilizing alkali metal ortho-silicates to produce an alkali metal silicate that is granular, freeflowing and substantially non-caking which comprises preparing a solution thereof, mixing up to 15% of starch with said solution, then solidifying and comminuting the ortho-silicate and starch.

6. Granular freeflowing alkali metal silicate stabilized with from substantially 3.5 to 15% of intimately incorporated starch.

7. Granular freeflowing alkali metal ortho-silicate stabilized with from substantially 3.5 to 15% of intimately incorporated starch.

8. A granular high alkali silicate possessing free flowing characteristics and capable of being stored and shipped in wooden containers without charring the container or becoming caked or gummy comprising alkali metal silicate and up to substantially 15% of starch.

9. A granular high alkali silicate possessing free flowing characteristics and capable of being stored and shipped in wooden containers without charring the container or becoming caked, or gummy comprising sodium silicate and up to substantially 15% of starch.

10. A silicate having more than one molecule of sodium oxide to each molecule of silica which is granular and free flowing and may be stored and shipped in wooden containers without charring comprising a sodium silicate and up to substantially 15% of starch.

11. A granular high alkali ratio silicate in non-gummy, non-pasty, non-caking form useful as a detergent and as an ingredient in detergents comprising sodium silicate with more than one molecule of sodium oxide to each molecule of silica and from substantially 3.5 to 15% of starch.

12. Stabilized freeflowing granular sodium ortho-silicate containing at least about 3.5% and not exceeding substantially 15% of starch.

GEORGE W. HALLOCK.
JAMES CARDELL.
EBENEZER SKINNER.